United States Patent
Wang

(10) Patent No.: US 9,641,834 B2
(45) Date of Patent: May 2, 2017

(54) RTP PAYLOAD FORMAT DESIGNS

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 234 days.

(21) Appl. No.: 14/228,164

(22) Filed: Mar. 27, 2014

(65) Prior Publication Data

US 2014/0294093 A1    Oct. 2, 2014

Related U.S. Application Data

(60) Provisional application No. 61/806,705, filed on Mar. 29, 2013.

(51) Int. Cl.
*H04N 19/169* (2014.01)
*H04L 29/06* (2006.01)
(Continued)

(52) U.S. Cl.
CPC ..... *H04N 19/00327* (2013.01); *H04L 65/604* (2013.01); *H04L 65/607* (2013.01);
(Continued)

(58) Field of Classification Search
CPC ....... H04N 19/00327; H04N 21/44004; H04N 19/70; H04N 19/88; H04N 21/64784;
(Continued)

(56) References Cited

U.S. PATENT DOCUMENTS 4,709,340 A    11/1987    Capizzi et al.
5,970,443 A    10/1999    Fujii
(Continued)

FOREIGN PATENT DOCUMENTS

WO    2004075555 A1    9/2004
WO    2012059385 A1    5/2012

OTHER PUBLICATIONS

S. Wenger, "RTP Payload Format for H.264 Video", The Internet Society (2005), Feb. 2005.*
(Continued)

*Primary Examiner* — Sath V Perungavoor
*Assistant Examiner* — Philip Dang
(74) *Attorney, Agent, or Firm* — Shumaker & Sieffert, P.A.

(57) ABSTRACT

A device for processing video data includes a memory, a receiver configured to real-time transport protocol (RTP) packets, and one or more processors configured to receive a first aggregation packet according to a real-time transfer protocol (RTP), wherein the first aggregation packet comprises a payload header and one or more aggregation units; parse a first aggregation unit that is the first aggregation unit of the first aggregation packet to determine a value for a first parameter, wherein the first parameter specifies a decoding order number for a NAL unit included in the first aggregation packet; parse a second aggregation unit to determine a value for a second parameter, wherein the second aggregation unit follows the first aggregation unit in the first aggregation packet; and, based on the first parameter and the second parameter, determine a decoding order for a NAL unit included in the second aggregation unit.

24 Claims, 11 Drawing Sheets

(51) Int. Cl.
*H04N 21/6437* (2011.01)
*H04N 21/647* (2011.01)
*H04N 19/70* (2014.01)
*H04N 19/88* (2014.01)
*H04N 21/44* (2011.01)

(52) U.S. Cl.
CPC ............ *H04L 65/608* (2013.01); *H04L 69/22* (2013.01); *H04N 19/70* (2014.11); *H04N 19/88* (2014.11); *H04N 21/44004* (2013.01); *H04N 21/6437* (2013.01); *H04N 21/64784* (2013.01)

(58) Field of Classification Search
CPC . H04N 21/6437; H04L 65/608; H04L 65/607; H04L 65/604; H04L 69/22
See application file for complete search history.

(56) References Cited

U.S. PATENT DOCUMENTS

| | | | |
|---|---|---|---|
| 6,263,312 B1 | 7/2001 | Kolesnik et al. | |
| 7,542,435 B2* | 6/2009 | Leon | H04L 29/06027 370/252 |
| 7,675,872 B2* | 3/2010 | Zhu | H04N 21/44004 370/260 |
| 8,335,265 B2* | 12/2012 | Hannuksela | H04N 21/44004 375/240.01 |
| 8,352,625 B2* | 1/2013 | Wang | G06F 15/16 370/351 |
| 8,355,448 B2* | 1/2013 | Hannuksela | H04N 21/234327 370/329 |
| 9,350,781 B2 | 5/2016 | Coban et al. | |
| 2001/0036286 A1 | 11/2001 | Layton et al. | |
| 2002/0044605 A1 | 4/2002 | Nakamura | |
| 2004/0131196 A1 | 7/2004 | Malham | |
| 2004/0223551 A1 | 11/2004 | Hannuksela | |
| 2004/0228413 A1 | 11/2004 | Hannuksela | |
| 2005/0002525 A1 | 1/2005 | Alkove et al. | |
| 2005/0008240 A1 | 1/2005 | Banerji et al. | |
| 2005/0254427 A1 | 11/2005 | Leon et al. | |
| 2006/0126852 A1 | 6/2006 | Bruno et al. | |
| 2006/0215711 A1 | 9/2006 | Mori | |
| 2007/0201549 A1* | 8/2007 | Hannuksela | H04N 21/234327 375/240.01 |
| 2007/0206673 A1 | 9/2007 | Cipolli et al. | |
| 2008/0040498 A1 | 2/2008 | Setlur et al. | |
| 2008/0046588 A1 | 2/2008 | Deshpande et al. | |
| 2008/0080619 A1 | 4/2008 | Heng et al. | |
| 2008/0205511 A1 | 8/2008 | Hannuksela et al. | |
| 2008/0205529 A1 | 8/2008 | Hannuksela et al. | |
| 2008/0214176 A1 | 9/2008 | Amon et al. | |
| 2009/0092259 A1 | 4/2009 | Jot et al. | |
| 2009/0201990 A1 | 8/2009 | Leprovost et al. | |
| 2009/0213938 A1 | 8/2009 | Lee et al. | |
| 2009/0245283 A1 | 10/2009 | MacDonald et al. | |
| 2010/0049865 A1 | 2/2010 | Hannuksela et al. | |
| 2010/0067522 A1 | 3/2010 | Jung et al. | |
| 2010/0085247 A1 | 4/2010 | Venkatraman et al. | |
| 2010/0111165 A1 | 5/2010 | Kim et al. | |
| 2010/0161823 A1 | 6/2010 | Jung et al. | |
| 2011/0090921 A1 | 4/2011 | Anthru et al. | |
| 2011/0134994 A1 | 6/2011 | Lu et al. | |
| 2011/0222545 A1 | 9/2011 | Eleftheriadis | |
| 2011/0224995 A1 | 9/2011 | Kovesi et al. | |
| 2011/0249738 A1 | 10/2011 | Suzuki et al. | |
| 2011/0261973 A1 | 10/2011 | Nelson et al. | |
| 2011/0280314 A1 | 11/2011 | Sankaran et al. | |
| 2011/0305344 A1 | 12/2011 | Sole et al. | |
| 2012/0014527 A1 | 1/2012 | Furse | |
| 2012/0155653 A1 | 6/2012 | Jax et al. | |
| 2012/0300663 A1* | 11/2012 | Lu | H04L 1/1671 370/252 |
| 2013/0003579 A1 | 1/2013 | Lu et al. | |
| 2013/0216070 A1 | 8/2013 | Keiler et al. | |
| 2014/0029758 A1 | 1/2014 | Nakadai et al. | |
| 2014/0294064 A1 | 10/2014 | Wang | |
| 2014/0294092 A1 | 10/2014 | Wang | |
| 2014/0355616 A1 | 12/2014 | Coban et al. | |
| 2015/0110118 A1 | 4/2015 | Ouedraogo et al. | |
| 2015/0189336 A1 | 7/2015 | Wang et al. | |
| 2015/0213803 A1 | 7/2015 | Peters et al. | |
| 2015/0213805 A1 | 7/2015 | Peters et al. | |
| 2015/0213809 A1 | 7/2015 | Peters et al. | |
| 2015/0332690 A1 | 11/2015 | Kim et al. | |
| 2015/0332691 A1 | 11/2015 | Kim et al. | |
| 2015/0332692 A1 | 11/2015 | Kim et al. | |

OTHER PUBLICATIONS

S. Wenger, "RTP Payload Format for Scalable Video Coding", Internet Engineering Task Force, (ISSN: 2070-1721), May 2011.*
Y.-K. Wang, "RTP Payload Format for H.264 Video", Internet Engineering Task Force, (ISSN: 2070-1721), May 2011.*
Y.-K. Wang, "RTP Payload Format for MVC Video", Internet Engineering Task Force, Jun. 25, 2012.*
Westerlund, M., "Multiple Media Types in an RTP Session", Feb. 25, 2013.*
Schierl, T., "RTP Payload Format for High Efficiency Video Coding", Feb. 27, 2012.*
Schierl, T., "RTP Payload Format for High Efficiency Video Coding", Oct. 22, 2012.*
Schierl, T., "RTP Payload Format for High Efficiency Video Coding", Jun. 11, 2013.*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

(56) References Cited

OTHER PUBLICATIONS

Carminati, et al., "Towards Scalable Audiovisual Broadcasting Networks: Overview of the Toscane Project", International Broadcasting Conference 2009; Amsterdam Sep. 9, 2009, XP030081693, 11 pp.
Schierl, et al., "RTP Payload Format for High Efficiency Video Coding; draft-schierl-payload-rtp-h265-01.txt", RTP Payload Format for High Efficiency Video Coding, draft-schierl-payload-rtp-h265-01.txt, Internet Engineering Task Force, IETF, Standardworkingdraft, Internet Society (ISOC) 4, Rue Des Falaises CH-1205 Geneva, Switzerland, Oct. 22, 2012, XP015088411, 45 pp.
Schierl, et al., "RTP Payload Format for High Efficiency Video Coding; draft-schierl-payload-rtp-h265-02.txt", RTP Payload Format for High Efficiency Video Coding, draft-schierl-payload-rtp-h265-02.txt, Internet Engineering Task Force, IETF, Standardworkingdraft, Internet Society (ISOC) 4, Rue Des Falaises CH-1205 Geneva, Switzerland, Jun. 11, 2013, XP015090627, 69 pp.
Wang, et al., RTP Payload Format for H.264 Video; RFC 6184, RTP Payload Format for H.264 Video, RFC6184.txt, Internet Engineering Task Force, IETF, Standard, Internet Society (ISOC) 4, Rue Des Falaises CH-1205 Geneva, Switzerland, May 4, 2011, XP015075997, 101 pp.
Wang, et al., RTP Payload Format for Scalable Video Coding; RFC 6190; RTP Payload Format for Scalable Video Coding RFC6190. txt, Internet Engineering Task Force, IETF; Standard, Internet Society (ISOC) 4, Rue Des Falaises CH-1205 Geneva, Switzerland, May 7, 2011, XP015075999, 101 pp.
Wang, et al., "RIP Payload Format for Scalable Video Coding; draft-ietf-avt-rtp-svc-27.txt", RTP Payload Format for Scalable Video Coding; draft-ietf-avt-rip-svc-27.txt, Internet Engineering Task Force, IETF; Standardworkingdraft, Internet Society (ISOC) 4, Rue Des Falaises CH-1205 Geneva, Switzerland, No. 27, Feb. 2, 2011, XP015073785, 105 pp.
Schulzrinne, et al., "RTP: A Transport Protocol for Real-Time Applications," Network Working Group, RFC 3550, Jul. 2003, 89 pp.
ITU-T H.223, Series H: Audiovisual and Multimedia Systems, Infrastructure of audiovisual services—Transmission mutiplexing and synchronization, Multiplexing protocol for low bit rate multimedia communication; The International Telecommunication Union. Jul. 2001, 74 pp.
Ott, et al., "RTP Payload Format for ITU-T Rec. H.263 Video," Network Working Group, RFC 4629, Jan. 2007, 29 pp.
International Search Report and Written Opinion from International Application No. PCT/US2014/032231, dated Jul. 2, 2014, 13 pp.
Second Written Opinion from International Application No. PCT/US2014/032231, dated Mar. 11, 2015, 7 pp.
International Preliminary Report on Patentability from International Application No. PCT/US2014/032231, dated Jun. 12, 2015, 9 pp.
Boehm, et al., "Detailed Technical Description of 3D Audio Phase 2 Reference Model 0 for HOA technologies", MPEG Meeting; Oct. 2014; Strasbourg; (Motion Picture Expert Group or ISO/IEC JTC1/SC29/WG11), No. m35057, XP030063429, 130 pp.
Daniel, et al., "Ambisonics Encoding of Other Audio Formats for Multiple Listening Conditions," Audio Engineering Society Convention 105, Sep. 1998, San Francisco, CA, Paper No. 4795.
Davis R.E., et al., "A Simple and Efficient Method for Real-Time Computation and Transformation of Spherical Harmonic-Based Sound Fields", Proceedings of the AES 133rd Convention, 2012, pp. 1-10.
DVB Organization: "ISO-IEC_23008-3_(E)_(DIS of 3DA). docx", DVB, Digital Video Broadcasting, C/0 EBU-17A Ancienne Route-CH-1218 Grand Saconnex, Geneva-Switzerland, Aug. 8, 2014 (Aug. 8, 2014), pp. 1-431, XP017845569.
Gauthier, et al., "Beamforming Regularization,Scaling Matrices and Inverse Problems for Sound Field Extrapolation and Characterization: Part I Theory," 2011, in Audio Engineering Society 131st Convention, New York, USA, 2011, pp. 1-32.

Gauthier, et al., "Derivation of Ambisonics Signals and Plane Wave Description of Measured Sound Field Using Irregular Microphone Arrays and Inverse Problem Theory," 2011, In Ambisonics Symposium 2011, Lexington, Jun. 2011, pp. 1-17.
Gerzon M.A., "Ambisonics in Multichannel Broadcasting and Video", Journal of the Audio Engineering Society, 1985, vol. 33(11), pp. 859-871.
Hagai H.B., et al., "Acoustic centering of sources measured by surrounding spherical microphone arrays", 2011, In The Journal of the Acoustical Society of America, vol. 130, No. 4, pp. 2003-2015.
Herre, et al., "MPEG-H 3D Audio—The New Standard for Coding of Immersive Spatial Audio," IEEE Journal of Selected Topics in Signal Processing, vol. 9, No. 5, Aug. 2015, 10 pp.
"Information technology—High efficiency coding and media delivery in heterogeneous environments—Part 3: 3D Audio," ISO/IEC JTC 1/SC 29, Apr. 4, 2014, 337 pp.
"Information technology—High efficiency coding and media delivery in heterogeneous environments—Part 3: 3D Audio," ISO/IEC JTC 1/SC 29, Jul. 25, 2014, 311 pp.
"Information technology—High efficiency coding and media delivery in heterogeneous environments—Part 3: Part 3: 3D Audio, Amendment 3: MPEG-H 3D Audio Phase 2," ISO/IEC JTC 1/SC 29, Jul. 25, 2015, 208 pp.
Information technology—MPEG audio technologies—Part 3: Unified speech and audio coding, ISO/IEC JTC 1/SC 291 WG 11, Sep. 20, 2011, 291 pp.
Malham, "Higher order ambisonic systems for the spatialization of sound", in Proceedings of the International Computer Music Conference, Oct. 1999, Beijing, China, pp. 484-487.
Mathews, et al., "Multiplication-Free Vector Quantization Using L1 Distortion Measure and Its Variants", Multidimensional Signal Processing, Audio and Electroacoustics, Glasgow, May 23-26, 1989, [International Conference on Acoustics, Speech & Signal Processing, ICASSP], New York, IEEE, US, vol. 3, pp. 1747-1750, XP000089211.
Moreau S., et al., "3D Sound Field Recording with Higher Order Ambisonics—Objective Measurements and Validation of Spherical Microphone", 2006, Audio Engineering Society Convention Paper 6857, pp. 1-24.
Painter, et al., Perceptual Coding of Digital Audio, Proceedings of the IEEE, vol. 88, No. 4, Apr. 2000, pp. 451-513.
Poletti M., "Unified Description of Ambisonics Using Real and Complex Spherical Harmonics," Ambisonics Symposium Jun. 25-27, 2009, 10 Pages.
Pulkki V., "Spatial Sound Reproduction with Directional Audio Coding," Journal of the Audio Engineering Society, Jun. 2007, vol. 55 (6), pp. 503-516.
Rafaely, B., "Spatial alignment of acoustic sources based on spherical harmonics radiation analysis," 2010, in Communications, Control and Signal Processing (ISCCSP), 2010 4th International Symposium, Mar. 3-5, 2010, 5 pp.
Sayood, et al., "Application to Image Compression—JPEG," Introduction to Data Compression, Third Edition, Dec. 15, 2005, Chapter 13.6, pp. 410-416.
Sen D., et al., "Differences and Similarities in Formats for Scene Based Audio," ISO/IEC JTC1/SC29/WG11 MPEG2012/M26704, Oct. 2012, Shanghai, China, 7 Pages.
U.S. Appl. No. 14/729,486, filed on Jun. 3, 2015, by Zhang et al.
Response to Written Opinion dated Oct. 6, 2014, from International Application No. PCT/US2014/040008, filed on Mar. 27, 2015, 7 pp.
Second Written Opinion from International Application No. PCT/US2014/040008, dated May 22, 2015, 8 pp.
Rockway, et al., "Interpolating Spherical Harmonics for Computing Antenna Patterns," Systems Center Pacific, Technical Report 1999, Jul. 2011, 40 pp.
Conlin, "Interpolation of data points on a sphere: spherical harmonics as basis functions," Feb. 28, 2012, 6 pp.
Stohl, et al., "An intercomparison of results from three trajectory models," Meteorol. Appl. 8, Jun. 2001, pp. 127-135.
Ruffini, et al. "Spherical Harmonics Interpolation, Computation of Laplacians and Gauge Theory," Starlab Research Knowledge, Oct. 25, 2001, 16 pp.

(56) References Cited

OTHER PUBLICATIONS

Westerlund, "Multiple Media Types in an RTP Session," Version 01, AVTCORE WG, Oct. 22, 2012, 19 pp.
Schierl, et al., "Wireless broadcasting using the scalable extension of H.264/AVC," Multimedia and Expo, 2005. ICME 2005. IEEE International Conference Jul. 6, 2005, pp. 884-887.
Hoffman, et al., "RTP Payload Format for MPEG1/MPEG2 Video," Network Working Group, RFC 2250, Jan. 1998, 8 pp.
Schierl, et al., "RTP Payload Format for High Efficiency Video Coding," draft-schierl-payload-rtp-h265-02.txt, Jun. 11, 2013, 69 pp.
Schmidt, et al., "RTP Payload Format for MPEG-4 Audio/Visual Streams," Internet Engineering Task Force (IETF) Request for Comments: 6416, Oct. 2011, 1 pp.
Schulzrinne, et al., "RTP: A Transport Protocol for Real-Time Applications," Network Working Group Request for Comments: 1889, Jan. 1996, 75 pp.
Van Der Meer, et al., "RTP Payload Format for Transport of MPEG-4 Elementary," Network Working Group, RFC 3640. Nov. 2003. 22 pp.
Wenger, et al., "RTP Payload Format for Scalable Video Coding," Internet Engineering Task Force (IETF), May 2011, 100 pp.
Wenger S., et al., "RTP payload Format for H.264 Video; draft-ietf-avt-rtph264- 02.txt," 5, JCT-VC Meeting; 96, MPEG Meeting; Mar. 16, 2011-Mar. 23, 2011; Geneva; (Joint Collaborative Team on Video Coding of ISO/IEC JTC1/SC29/WG11 and ITU-T SG:16 ); URL: Htip://wftp3.1tu_int/av-arch/jctvc-site/, Internet Engineering Task Force, IETF, CH, vol. avt, No. 2, Jun. 1, 2003 (Jun. 1, 2003), XP015001402, ISSN: 0000-0004, 56 pp.
Westerlund M., et al., "Multiple Media Types in an RTP Session—draft-ietf-avtcore-multi-media-rtp-session-02", AVTCORE WG, Feb. 25, 2013, 22 pp.

* cited by examiner

RTP PAYLOAD FORMAT DESIGNS

This application claims the benefit of:
U.S. Provisional Application 61/806,705 filed 29 Mar. 2013, the entire content of which is incorporated by reference herein.

TECHNICAL FIELD

This disclosure relates to the processing of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for processing video data. In particular, this disclosure describes improved real-time transport protocol (RTP) payload format designs.

In one example, a method of processing video data includes receiving a first aggregation packet according to a real-time transfer protocol (RTP), wherein the first aggregation packet comprises a payload header and one or more aggregation units; parsing a first aggregation unit that is the first aggregation unit of the first aggregation packet to determine a value for a first parameter, wherein the first parameter specifies a decoding order number for a NAL unit included in the first aggregation packet; parsing a second aggregation unit to determine a value for a second parameter, wherein the second aggregation unit follows the first aggregation unit in the first aggregation packet; and based on the first parameter and the second parameter, determining a decoding order for a NAL unit included in the second aggregation unit.

In another example, a device for processing video data includes a memory; a receiver configured to real-time transport protocol (RTP) packets, and one or more processors configured to receive a first aggregation packet according to a real-time transfer protocol (RTP), wherein the first aggregation packet comprises a payload header and one or more aggregation units; parse a first aggregation unit that is the first aggregation unit of the first aggregation packet to determine a value for a first parameter, wherein the first parameter specifies a decoding order number for a NAL unit included in the first aggregation packet; parse a second aggregation unit to determine a value for a second parameter, wherein the second aggregation unit follows the first aggregation unit in the first aggregation packet; and based on the first parameter and the second parameter, determine a decoding order for a NAL unit included in the second aggregation unit.

In another example a computer-readable storage medium stores instructions that when executed by one or more processors cause the one or more processors to receive a first aggregation packet according to a real-time transfer protocol (RTP), wherein the first aggregation packet comprises a payload header and one or more aggregation units; parse a first aggregation unit that is the first aggregation unit of the first aggregation packet to determine a value for a first parameter, wherein the first parameter specifies a decoding order number for a NAL unit included in the first aggregation packet; parse a second aggregation unit to determine a value for a second parameter, wherein the second aggregation unit follows the first aggregation unit in the first aggregation packet; and based on the first parameter and the second parameter, determine a decoding order for a NAL unit included in the second aggregation unit.

In another example, an apparatus for processing video data includes means for receiving a first aggregation packet according to a real-time transfer protocol (RTP), wherein the first aggregation packet comprises a payload header and one or more aggregation units; means for parsing a first aggregation unit that is the first aggregation unit of the first aggregation packet to determine a value for a first parameter, wherein the first parameter specifies a decoding order number for a NAL unit included in the first aggregation packet; means for parsing a second aggregation unit to determine a value for a second parameter, wherein the second aggregation unit follows the first aggregation unit in the first aggregation packet; and means for determining a decoding order for a NAL unit included in the second aggregation unit based on the first parameter and the second parameter.

In another example, a method of processing video data includes packetizing one or more NAL units into a first aggregation packet according to an RTP protocol; setting a value for a first parameter of a first aggregation unit based on a decoding order number for the first aggregation unit; and, based on a difference between a decoding order for a second aggregation unit and the decoding order number for the first aggregation unit, setting a value for a second parameter of a second aggregation unit.

The details of one or more examples are set forth in the accompanying drawings and the description below. Other features, objects, and advantages will be apparent from the description and drawings, and from the claims.

DETAILED DESCRIPTION

Figure 1:
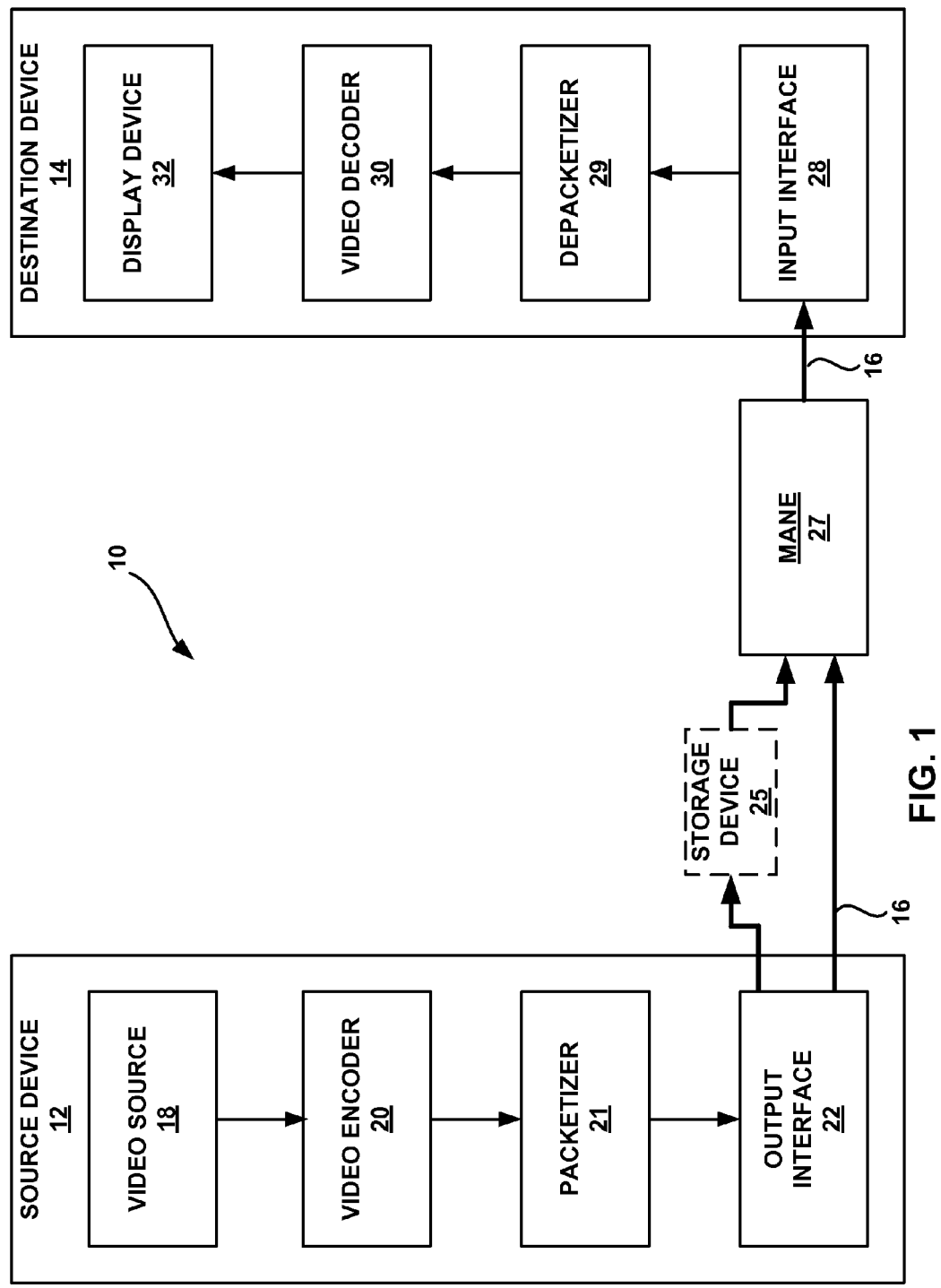
FIG. 1 is a block diagram illustrating an example video encoding and decoding system that may utilize the techniques described in this disclosure.

This disclosure introduces various techniques for improved designs of a real-time transport protocol (RTP) payload format for transporting encoded video data over RTP. RTP is a transport protocol, as specified in IETF RFC 3550, which as of 29 Mar. 2013, is available from http://www.ietf.org/rfc/rfc3550.txt, and which is incorporate herein by reference in its entirety. According to IETF RFC 3550, RTP was developed with the intent of providing end-to-end delivery services for data with real-time characteristics, such as interactive audio and video. Data transported in accordance with RTP is packetized into RTP packets. RTP packets are data packets that include an RTP header and payload data. The payload data of an RTP packet may be encoded video data. The encoded video data may, for example, be in the form of one or more network abstraction layer (NAL) units.

To transport video data encoded according to a video codec over RTP, an RTP payload format for the video codec may need to be specified. For example, RFC 6184 (which as of 29 Mar. 2013 is available at http://www.ietf.org/rfc/rfc6184.txt) specifies the RTP payload format for H.264 video, and RFC 6190 (which as of 29 Mar. 2013 is available at http://www.ietf.org/rfc/rfc6190.txt) specifies the RTP payload format for SVC video, both of which are hereby incorporate by reference in their entirety. A recent draft of the RTP payload format for HEVC video is available, as of 29 Mar. 2013, from http://tools.ietf.org/html/draft-schierl-payload-rtp-h265-01, and which is hereby incorporate by reference in its entirety. These various standards describe how the coded video data (e.g. coded NAL units) are packetized into RTP packets.

According to the HEVC specification, a NAL unit is defined as a syntax structure containing an indication of the type of data to follow and bytes containing that data in the form of a raw byte sequence payload (RBSP) interspersed as necessary with emulation prevention bytes. A VCL NAL unit includes video coding layer data, while a non-VCL NAL unit may include some other data about the video coding layer data. According to HEVC, an access unit is defined as a set of NAL units that are associated with each other according to a specified classification rule, are consecutive in decoding order, and contain exactly one coded picture. In addition to containing the VCL NAL units of the coded picture, an access unit may also contain non-VCL NAL units. The decoding of an access unit always results in a decoded picture. RTP packets are packets used for transporting NAL unit.

The designs of the RTP payload formats in RFC 6184 and RFC 6190, and the existing draft RTP payload format for HEVC are associated with several potential problems or shortcomings. As one example, multiple packetization modes are specified and many types of packets are specified, making it potentially difficult to choose the packetization mode and packet types to use. As another example, interleaving of network abstraction layer (NAL) units of one access unit is only possible by using the Multi-Time Aggregation Packets (MTAPs) as defined in RFC 6184 and RFC 6190. However, when NAL units of only one access unit are aggregated in one RTP packet, they all have the same timestamp. Thus, simply relying on the RTP timestamp of the RTP packet is sufficient but sending additional time information as required by RFC 6184 and RFC 6190 potentially wastes bandwidth. Interleaving of NAL units of one access unit allows for transport of interleaved coded slices of one picture in different packets, thus when one packet gets lost, received neighboring slices can be utilized for better concealment.

To address the potential problems and shortcomings introduced above, this disclosure introduces several techniques for improved RTP payload format designs. According to one technique, packetization mode is not differentiated, such that both non-interleaved and interleaved packetization are possible, both single-session transmission and multi-session transmission are possible, and a unified de-packetization process is specified based on absolute decoding order number values of NAL unites, which may be derived from optional information signaled in the packet payloads.

According to another technique, the design of aggregation packets allows for interleaving of NAL units of one access unit without requiring sending redundant time information. Aggregation packets, as described in this disclosure, may improve video coding when multiple small slices are being transported. Allowing the interleaving of NAL units in accordance with the techniques of this disclosure may improve overall reconstructed image quality. For example, if aggregation packets include interleaved NAL units and an aggregation packet is lost, then the interleaved NAL units are likely to correspond to a dispersed group of video blocks instead of adjacent video blocks. Error concealment techniques are typically more effective for smaller areas of loss, and thus, may be more effective concealing the loss of a dispersed group of video blocks compared to concealing the loss of a group of adjacent video blocks.

FIG. 1 is a block diagram illustrating an example video processing system 10 that may be used in conjunction with the techniques described in this disclosure. System 10 may, for example, generate, process, and transmit video data using the RTP techniques described in this disclosure. As shown in FIG. 1, system 10 includes a source device 12 that generates encoded video data to be decoded at a later time by a destination device 14. The encoded video data may be routed from source device 12 to destination device 14 by a media aware network element (MANE) 29. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

System 10 may operate in accordance with different video coding standards, a proprietary standard or technique, or any other way of multiview coding. For example, video encoder 20 and video decoder 30 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A current joint draft of the MVC extension has been approved as of January 2012.

In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, referred to as HEVC WD9 is available, as of 15 Mar. 2013, from http://phenix.int-evey.fr/jct/doc_end_user/documents/ 11_Shanghai/wg11/JCTVC-K1003-v10.zip. For purposes of description, video encoder 20 and video decoder 30 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein. The techniques of this disclosure are potentially applicable to several video coding standards, including HEVC and others.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Link 16 may include one or more MANEs, such as MANE 27, that route the video data from source device 12 to destination device 14.

Alternatively, encoded data may be output from output interface 22 to a storage device 25. Similarly, encoded data may be accessed from storage device 25 by input interface. Storage device 25 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 25 may correspond to a file server or another intermediate storage device that may hold the encoded video generated by source device 12. Destination device 14 may access stored video data from storage device 25 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 25 may be a streaming transmission, a download transmission, or a combination of both. Video data retrieved from storage device 25 may be routed to destination device 14 using one or more MANEs, such as MANE 27.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, packetizer 21, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 25 for later access by destination device 14 or other devices, for decoding and/or playback.

Destination device 14 includes an input interface 28, depacketizer 29, video decoder 30, and display device 32. In some cases, input interface 28 may include a receiver and/or a modem. Input interface 28 of destination device 14 receives the encoded video data over link 16. The encoded video data communicated over link 16, or provided on storage device 25, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both blocks of luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes. The splitting of a treeblock may occur in the luma domain, and may be mimicked in the chroma domains, possibly with further subsampling of the leaf nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

The techniques described in this disclosure may be applied independently or jointly. Aspects of these techniques may be performed by packetizer 21 and depacketizer 29. In some instances, packetizer 21 may be referred to as an RTP sender, or simply as a sender, while depacketizer 29 may be referred to as an RTP receiver, or simply a receiver. Aspects of these techniques are summarized as follows:

Signaling of the first the address of the first coding tree unit (CTU) of a coded tile transported in a Fragment Unit (FU)

The tile ID (or a delta of two tile ID values) is signaled in the FU structure, before the FU payload. This signaling specifies or indicates the CTU address in tile scan (as well as the address in raster scan) of the first CTU in the tile.

Alternatively, the CTU address in tile scan (or a delta of two such values) of the first CTU in a coded tile that is transported in an FU is signaled in the FU structure, before the FU payload.

Alternatively, the CTU address in raster scan (or a delta of two such values) of the first CTU in a coded tile that is transported in an FU is signaled in the FU structure, before the FU payload.

Alternatively, the signaling (in any of the above forms) is present only when there is an indication (e.g. a media type parameter) that indicates the presence of the signaling. Such a media type parameter may simply indicate the presence of the above signaling, or indicate the use of tiles (and if tiles are indicated not used, then the above signaling is not present).

When a tile is transported in multiple FUs:

Use/add an S flag in the FU header to indicate the start of a fragmented tile.

With this, the presence of any signaling mentioned above to derive the CTU address of the first CTU in the tile is (further) conditioned on the S flag being equal to 0.

Use/add an E flag in the FU header to indicate the end of a fragmented tile.

Use/add a flag in the RTP packet payload header to indicate whether all NAL units in the packet contain dependent slice segments.

Alternatively, two bits in the RTP packet header to indicate one of the following All NAL units in the packet are dependent slice segments.

At least one of the NAL units in the packet is a dependent slice segment for which the corresponding independent slice segment is not in the same packet.

At least one of the NAL units in the packet is an independent slice segment.

All NAL units in the packet are independent slice segments.

In a packet that contains only one NAL unit, only one bit is needed to indicate whether the NAL unit contains a dependent slice segment.

Alternatively, the signaling (in any of the above forms) is present only when there is an indication (e.g. a media type parameter) that indicates the presence of the signaling. Such a media type parameter may simply indicate the presence of the above signaling, or indicate the use of dependent slice segments (and if dependent slice segments are indicated not used, then the above signaling is not present).

Aspects of payload structures will now be described. These payload structures may be generated by packetizer 21 and parsed by depacketizer 29. The first two bytes of the payload of an RTP packet may define the payload header. The payload header may consist of the same fields as the HEVC NAL unit header (F, Type, LayerId, and TID, which correspond to the syntax elements forbidden_zero_bit, nal_unit_type, nuh_layer_id, and nuh_temporal_id_plus1 as specified in section 7.3.1.2 of HEVC WD 10), irrespective of the type of the payload structure.

Three different types of RTP packet payload structures are specified. A receiver can identify the type of an RTP packet payload through the Type field in the payload header. The receiver may be a depacketizer of a device that includes a video decoder, or may form part of a MANE or other network entity. The three different payload structures are as follows:

Single NAL unit packet: Contains a single NAL unit in the payload, and the NAL unit header of the NAL unit also serves as the payload header. Single NAL unit packets MUST NOT be used when tx-mode is equal to "MST" or sprop-depack-buf-nalus is greater than 0.

Aggregation packet (AP): Contains one or more NAL units within one access unit. See below.

Fragmentation unit (FU): Contains a subset of a single NAL unit. See below.

Transmission modes supported by packetizer 21 and depacketizer 29 will now be described. The techniques of this disclosure may enable transmission of an HEVC bitstream over a single RTP session or multiple RTP sessions. The concept and working principle is consistent with RFC6190 and follows a similar, but potentially simpler, design. If only one RTP session is used for transmission of the HEVC bitstream, the transmission mode is referred to as single-session transmission (SST); otherwise (more than one RTP session is used for transmission of the HEVC bitstream), the transmission mode is referred to as multi-session transmission (MST).

SST SHOULD be used for point-to-point unicast scenarios, while MST SHOULD be used for point-to-multipoint multicast scenarios where different receivers requires different operation points of the same HEVC bitstream, to improve bandwidth utilizing efficiency.

If tx-mode is equal to "SST", SST MUST be used. Otherwise (tx-mode is equal to "MST"), MST MUST be used.

Aspects of decoding order number will now be described. For each NAL unit, the variable AbsDon is derived, representing the decoding order number that indicates the NAL unit decoding order.

Let NAL unit n be the n-th NAL unit in transmission order within an RTP session.

If tx-mode is equal to "SST" and sprop-depack-buf-nalus is equal to 0, AbsDon[n], the value of AbsDon for NAL unit n, is derived as equal to n.

Otherwise (tx-mode is equal to "MST" or sprop-depack-buf-nalus is greater than 0), AbsDon[n] is derived as follows, where DON[n] is the value of the variable DON for NAL unit n:

If n is equal to 0 (i.e. NAL unit n is the very first NAL unit in transmission order), AbsDon[0] is set equal to DON[0].

Otherwise (n is greater than 0), the following applies for derivation of AbsDon[n]:

If DON[n]==DON[n-1],

AbsDon[n]=AbsDon[n-1]

If (DON[n]>DON[n-1] and DON[n]-DON[n-1] <32768),

AbsDon[n]=AbsDon[n-1]+DON[n]-DON[n-1]

If (DON[n]<DON[n-1] and DON[n-1]-DON[n] >=32768),

AbsDon[n]=AbsDon[n-1]+65536-DON[n-1]+DON[n]

If (DON[n]>DON[n-1] and DON[n]-DON[n-1] >=32768),

AbsDon[n]=AbsDon[n-1]-(DON[n-1]+65536-DON[n])

If (DON[n]<DON[n-1] and DON[n-1]-DON[n] <32768),

AbsDon[n]=AbsDon[n-1]-(DON[n-1]-DON[n])

For any two NAL units m and n, the following applies:

AbsDon[n] greater than AbsDon[m] indicates that NAL unit n follows NAL unit m in NAL unit decoding order.

When AbsDon[n] is equal to AbsDon[m], the NAL unit decoding order of the two NAL units can be in either order.

AbsDon[n] less than AbsDon[m] indicates that NAL unit n precedes NAL unit m in decoding order.

When two consecutive NAL units in the NAL unit decoding order have different values of AbsDon, the value of AbsDon for the second NAL unit in decoding order MUST be greater than the value of AbsDon for the first NAL unit, and the absolute difference between the two AbsDon values MAY be greater than or equal to 1.

Figure 2:
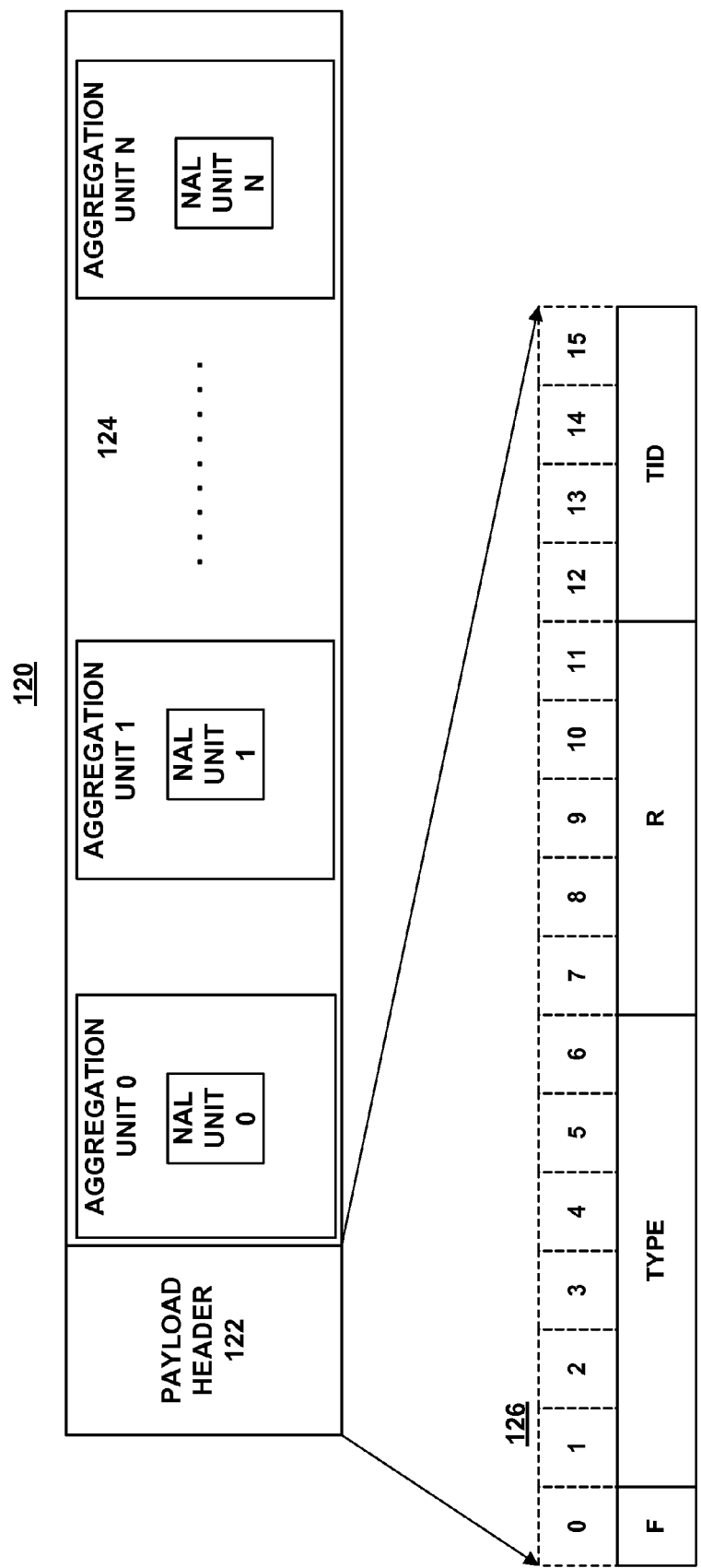
FIG. 2 shows a visual representation of an aggregation packet structure.

Aggregation Packets (APs) will now be described. FIG. 2 shows a visual representation of an aggregation packet structure. Aggregation packet 120 includes a payload header 122 (denoted as PayloadHdr) followed by payload data 124. The payload data includes one or more aggregation units, shown as aggregation packets 0 through N in FIG. 2. Each aggregation unit may include a NAL units. For example, aggregation unit 0 includes NAL unit 0, aggregation unit 1 includes NAL unit 1, and aggregation unit N includes NAL unit N. FIG. 2 also shows the first 16 bits of the payload header, which includes an F bit, a TYPE field, an R field (also sometimes referred to as a LayerId field), and a TID field.

APs were introduced to enable the reduction of packetization overhead for small NAL units, such as most of the non-VCL NAL units, which are often only a few octets in size. An AP aggregates NAL units within one access unit. Each NAL unit to be carried in an AP is encapsulated in an aggregation unit. NAL units aggregated in one AP are in NAL unit decoding order. An AP may consist of a payload header (denoted as PayloadHdr) followed by one or more aggregation units.

The fields in the payload header are set as follows. The F bit MUST be equal to 0 if the F bit of each aggregated NAL unit is equal to zero; otherwise, it MUST be equal to 1. The Type field MUST be equal to 48. The value of LayerId MUST be equal to the lowest value of LayerId of all the aggregated NAL units. The value of TID MUST be the lowest value of TID of all the aggregated NAL units.

An AP can carry as many aggregation units as necessary; however, the total amount of data in an AP obviously MUST fit into an IP packet, and the size SHOULD be chosen so that the resulting IP packet is smaller than the MTU size so to avoid IP layer fragmentation. An AP MUST NOT contain FUs. APs MUST NOT be nested; i.e., an AP MUST NOT contain another AP.

The first aggregation unit in an AP may consist of an optional 16-bit DONL field (in network byte order) followed by a 16-bit unsigned size information (in network byte order) that indicates the size of the NAL unit in bytes (excluding these two octets, but including the NAL unit header), followed by the NAL unit itself, including its NAL unit header.

The DONL field, when present, specifies the value of the 16 least significant bits of the decoding order number of the aggregated NAL unit.

If tx-mode is equal to "MST" or sprop-depack-buf-nalus is greater than 0, the DONL field MUST be present in an aggregation unit that is the first aggregation unit in an AP, and the variable DON for the aggregated NAL unit is derived as equal to the value of the DONL field. Otherwise (tx-mode is equal to "SST" and sprop-depack-buf-nalus is equal to 0), the DONL field MUST NOT be present in an aggregation unit that is the first aggregation unit in an AP.

An aggregation unit that is not the first aggregation unit in an AP may consist of an optional 8-bit DOND field followed by a 16-bit unsigned size information (in network byte order) that indicates the size of the NAL unit in bytes (excluding these two octets, but including the NAL unit header), followed by the NAL unit itself, including its NAL unit header.

When present, the DOND field plus 1 may specify the difference between the decoding order number values of the current aggregated NAL unit and the preceding aggregated NAL unit in the same AP. In contrast to payload structures that require NAL units to be decoded in the order in which they appear in RTP packets, the use of the DOND and DONL parameters described in this disclosure may allow for a specific decoding order to be specified.

If tx-mode is equal to "MST" or sprop-depack-buf-nalus is greater than 0, the DOND field MUST be present in an aggregation unit that is not the first aggregation unit in an AP, and the variable DON for the aggregated NAL unit is derived as equal to the DON of the preceding aggregated NAL unit in the same AP plus the value of the DOND field plus 1 modulo 65536. Otherwise (tx-mode is equal to "SST" and sprop-depack-buf-nalus is equal to 0), the DOND field MUST NOT be present in an aggregation unit that is not the first aggregation unit in an AP.

In an alternative, the DOND field may be of a different length, e.g., 4 bits. In another alternative, two non-first aggregation units share one 8-bit field, 4 bits for each aggregation unit to signal the DOND value. In yet another alternative, the length of the DOND field is signaled by a media type parameter, and the value of that parameter equal to 0 means that the DOND field is not present.

Fragmentation Units (FUs) will now be described. Fragmentation units (FUs) are introduced to enable fragmenting a single NAL unit into multiple RTP packets. A fragment of a NAL unit may consist of an integer number of consecutive octets of that NAL unit. Fragments of the same NAL unit MUST be sent in consecutive order with ascending RTP sequence numbers (with no other RTP packets within the same RTP packet stream being sent between the first and last fragment).

When a NAL unit is fragmented and conveyed within FUs, it is referred to as a fragmented NAL unit. APs MUST NOT be fragmented. FUs MUST NOT be nested; i.e., an FU MUST NOT contain another FU.

The RTP timestamp of an RTP packet carrying an FU is set to the NALU-time of the fragmented NAL unit.

An FU may consist of a payload header (denoted as PayloadHdr), an FU header of one octet, an optional 16-bit DONL field (in network byte order), and an FU payload.

The fields in the payload header are set as follows. The Type field MUST be equal to 49. The fields F, LayerId, and TID MUST be equal to the fields F, LayerId, and TID, respectively, of the fragmented NAL unit.

The FU header may consist of an S bit, an E bit, and a 6-bit Type field.

In this example, the semantics of the FU header fields are as follows:

S: 1 bit
When set to one, the S bit indicates the start of a fragmented NAL unit i.e., the first byte of the FU payload is also the first byte of the payload of the fragmented NAL unit. When the FU payload is not the start of the fragmented NAL unit payload, the S bit MUST be set to zero.

E: 1 bit
When set to one, the E bit indicates the end of a fragmented NAL unit, i.e., the last byte of the payload is also the last byte of the fragmented NAL unit. When the FU payload is not the last fragment of a fragmented NAL unit, the E bit MUST be set to zero.

Type: 6 bits
The field Type MUST be equal to the field Type of the fragmented NAL unit.

The DONL field, when present, may specify the value of the 16 least significant bits of the decoding order number of the fragmented NAL unit.

If tx-mode is equal to "MST" or sprop-depack-buf-nalus is greater than 0, and the S bit is equal to 1, the DONL field MUST be present in the FU, and the variable DON for the fragmented NAL unit is derived as equal to the value of the DONL field. Otherwise (tx-mode is equal to "SST" and sprop-depack-buf-nalus is equal to 0, or the S bit is equal to 0), the DONL field MUST NOT be present in the FU.

A non-fragmented NAL unit MUST NOT be transmitted in one FU; i.e., the Start bit and End bit MUST NOT both be set to one in the same FU header.

The FU payload may consist of fragments of the payload of the fragmented NAL unit so that if the FU payloads of consecutive FUs, starting with an FU with the S bit equal to 1 and ending with an FU with the E bit equal to 1, are sequentially concatenated, the payload of the fragmented NAL unit can be reconstructed. The NAL unit header of the fragmented NAL unit is not included as such in the FU payload, but rather the information of the NAL unit header of the fragmented NAL unit is conveyed in F, LayerId, and TID fields of the FU payload headers of the FUs and the Type field of the FU header of the FUs. An FU payload MAY have any number of octets and MAY be empty.

If an FU is lost, the receiver SHOULD discard all following fragmentation units in transmission order corresponding to the same fragmented NAL unit, unless the decoder in the receiver is known to be prepared to gracefully handle incomplete NAL units.

A receiver in an endpoint or in a MANE MAY aggregate the first n−1 fragments of a NAL unit to an (incomplete) NAL unit, even if fragment n of that NAL unit is not received. In this case, the forbidden_zero_bit of the NAL unit MUST be set to one to indicate a syntax violation.

Packetization rules will now be discussed. The following packetization rules apply:

- If tx-mode is equal to "MST" or sprop-depack-buf-nalus is greater than 0 for an RTP session, the transmission order of NAL units carried in the RTP session MAY be different than the NAL unit decoding order. Otherwise (tx-mode is equal to "SST" and sprop-depack-buf-nalus is equal to 0 for an RTP session), the transmission order of NAL units carried in the RTP session MUST be the same as the NAL unit decoding order.
- When tx-mode is equal to "MST" or sprop-depack-buf-nalus is greater than 0, single NAL unit packets cannot be used. In this case, an AP MAY be used to encapsulate a single NAL unit in one RTP packet.
- A NAL unit of small size SHOULD be encapsulated in an aggregation packet together with one or more other NAL units in order to avoid the unnecessary packet overhead for small NAL units. For example, non-VCL NAL units such as access unit delimiters, parameter sets, or SEI NAL units are typically small.
- Each non-VCL NAL unit SHOULD be encapsulated in an aggregation packet together with its associated VCL NAL unit, as typically a non-VCL NAL unit would be meaningless without the associated VCL NAL unit being available.
- The TID value indicates relative importance of an RTP packet. A lower value of TID indicates a higher importance. More important NAL units MAY be better protected against transmission losses than less important NAL units.

A de-packetization process will now be described. The general concept behind de-packetization is to get the NAL units out of the RTP packets in an RTP session and all the dependent RTP sessions, if any, and pass them to the decoder in the NAL unit decoding order.

The de-packetization process is implementation dependent. Therefore, the following description should be seen as an example of a suitable implementation. Other schemes may be used as well as long as the output for the same input is the same as the process described below. The output is the same meaning that the set of NAL units and their order are both identical. Optimizations relative to the described algorithms are possible.

All normal RTP mechanisms related to buffer management apply. In particular, duplicated or outdated RTP packets (as indicated by the RTP sequences number and the RTP timestamp) are removed. To determine the exact time for decoding, factors such as a possible intentional delay to allow for proper inter-stream synchronization must be factored in.

Only NAL units with NAL unit type values in the range of 0 to 47, inclusive MAY be passed to the decoder. NAL-unit-like structures with NAL unit type values in the range of 48 to 63, inclusive, MUST NOT be passed to the decoder.

The receiver includes a receiver buffer, which is used to compensate for transmission delay jitter, to reorder NAL units from transmission order to the NAL unit decoding order, and to recovery the NAL unit decoding order in MST, when applicable. In this section, the receiver operation is described under the assumption that there is no transmission delay jitter. To make a difference from a practical receiver buffer that is also used for compensation of transmission delay jitter, the receiver buffer is here after called the de-packetization buffer in this section. Receivers SHOULD also prepare for transmission delay jitter; i.e., either reserve separate buffers for transmission delay jitter buffering and de-packetization buffering or use a receiver buffer for both transmission delay jitter and de-packetization. Moreover, receivers SHOULD take transmission delay jitter into account in the buffering operation; e.g., by additional initial buffering before starting of decoding and playback.

There are two buffering states in the receiver: initial buffering and buffering while playing. Initial buffering starts when the reception is initialized. After initial buffering, decoding and playback are started, and the buffering-while-playing mode is used.

The receiver stores incoming packets in reception order into the receiver buffer and passes the NAL units in the RTP packets of each session in RTP sequence number order to the re-multiplexing buffer. The CS-DON value is calculated and stored for each NAL unit in the re-multiplexing buffer.

Regardless of the buffering state, the receiver stores incoming NAL units, in reception order, into the de-packetization buffer. NAL units carried in single NAL unit packets, APs, and FUs are stored in the de-packetization buffer individually, and the value of AbsDon is calculated and stored for each NAL unit.

Initial buffering lasts until condition A (the number of NAL units in the de-packetization buffer is greater than the value of sprop-depack-buf-nalus of the highest RTP session) is true. After initial buffering, whenever condition A is true, the following operation is repeatedly applied until condition A becomes false: The NAL unit in the de-packetization buffer with the smallest value of AbsDon is removed from the de-packetization buffer and passed to the decoder.

When no more NAL units are flowing into the de-packetization buffer, all NAL units remained in the de-packetization buffer are removed from the buffer and passed to the decoder in the order of increasing AbsDon values.

Media type registration will now be discussed. The media subtype for the HEVC codec is allocated from the IETF tree.

The receiver MUST ignore any unspecified parameter.
Media Type name: video
Media subtype name: H265
Required parameters: none
OPTIONAL parameters:
  tx-mode:
    This parameter indicates whether the transmission mode is SST or MST. This parameter may be a media type parameter that applies to all packets in one particular session. In other words, the value may be fixed for all packets of the session.

The value of tx-mode MUST be equal to either "MST" or "SST". When not present, the value of tx-mode is inferred to be equal to "SST".

If the value is equal to "MST", MST MUST be in use. Otherwise (the value is equal to "SST"), SST MUST be in use.

The value of tx-mode MUST be equal to "MST" for all RTP sessions in an MST.

sprop-depack-buf-nalus:

This parameter may specify the maximum number of NAL units that precede a NAL unit in the de-packetization buffer in reception order and follow the NAL unit in decoding order. This parameter may be a media type parameter that applies to all packets in one particular session. In other words, the value may be fixed for all packets of the session.

The value of sprop-depack-buf-nalus MUST be an integer in the range of 0 to 32767, inclusive.

When not present, the value of sprop-depack-buf-nalus is inferred to be equal to 0.

When the RTP session depends one or more other RTP sessions (in this case tx-mode MUST be equal to "MST"), the value of sprop-depack-buf-nalus MUST be greater than 0.

sprop-depack-buf-bytes:

This parameter signals the required size of the de-packetization buffer in units of bytes. The value of the parameter MUST be greater than or equal to the maximum buffer occupancy (in units of bytes) of the de-packetization buffer as specified in section 6.

The value of sprop-depack-buf-bytes MUST be an integer in the range of 0 to 4294967295, inclusive.

depack-buf-cap:

This parameter signals the capabilities of a receiver implementation and indicates the amount of de-packetization buffer space in units of bytes that the receiver has available for reconstructing the NAL unit decoding order. A receiver is able to handle any stream for which the value of the sprop-depack-buf-bytes parameter is smaller than or equal to this parameter.

When not present, the value of depack-buf-req is inferred to be equal to 0. The value of depack-buf-cap MUST be an integer in the range of 0 to 4294967295, inclusive.

Figure 3:
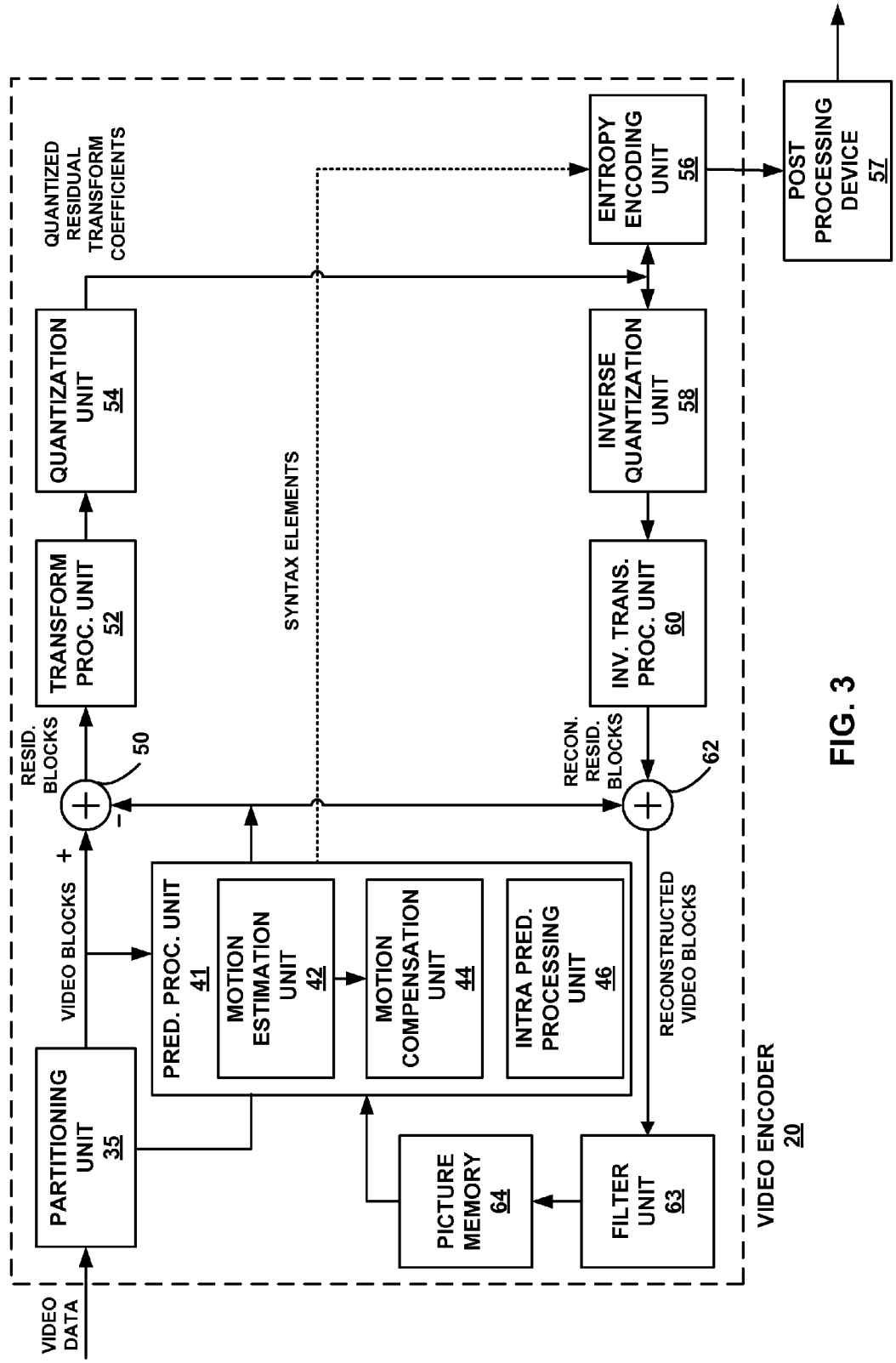
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 3 as being an in loop filter, in other configurations, filter unit 63 may be implemented as a post loop filter. FIG. 3 also shows post-processing device 57 which may perform additional processing on encoded video data generated by video encoder 20. The techniques of this disclosure may in some instances be implemented by video encoder 20. In other instances, however, the techniques of this disclosure may be implemented by post-processing device 57. For example, the techniques described with respect to packetizer 21 of FIG. 1 may, in some instances, be performed by a packetizer of post-processing device 57.

As shown in FIG. 3, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

Figure 4:
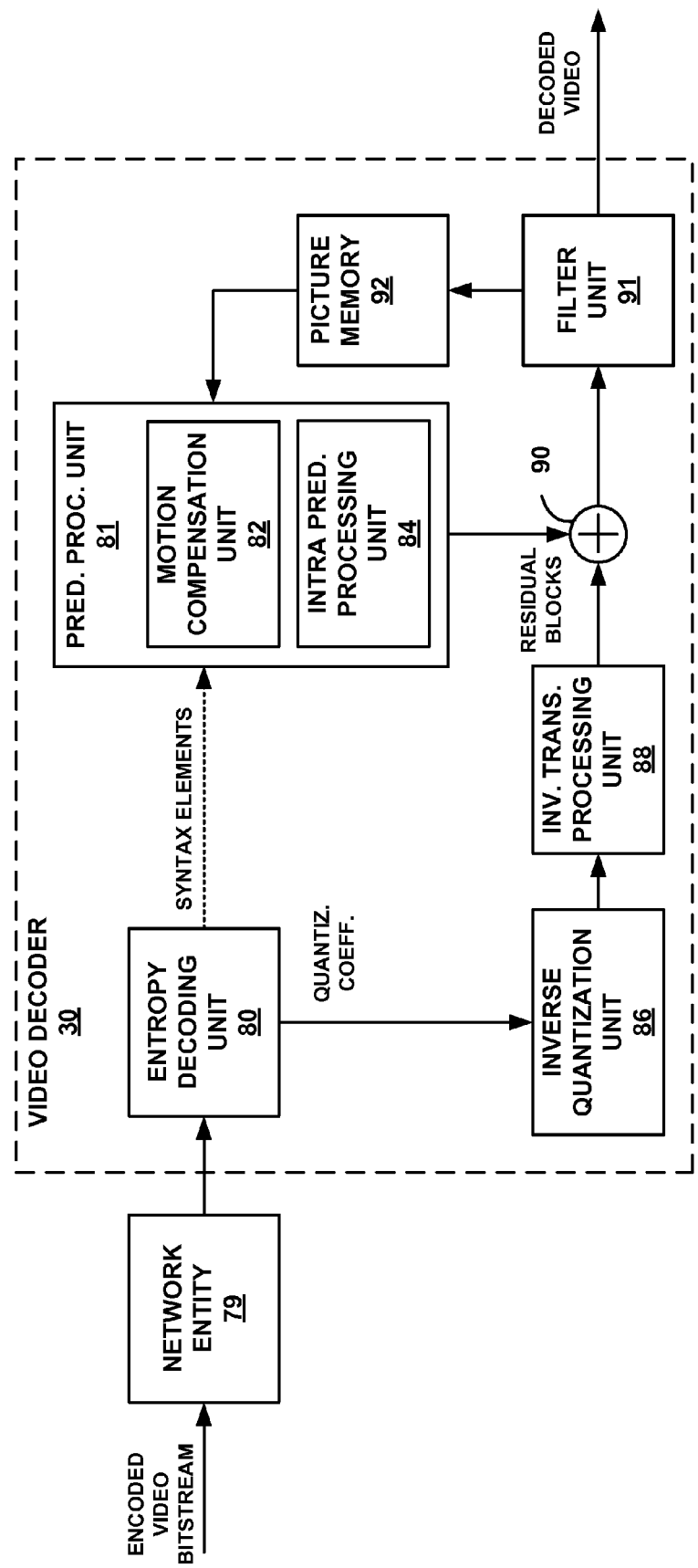
FIG. 4 is a block diagram illustrating an example video decoder that may implement the techniques described in this disclosure.

FIG. 4 is a block diagram illustrating an example network entity 79 and video decoder 30 that may implement the techniques described in this disclosure. In the example of FIG. 4, video decoder 30 includes an entropy decoding unit 80, prediction processing unit 81, inverse quantization unit 86, inverse transformation processing unit 88, summer 90, filter unit 91, and picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Video decoder 30 may receive the encoded video bitstream from a network entity 79. Network entity 79 may, for example, be a server, a MANE, a video editor/splicer, or other such device configured to implement one or more of the techniques described above. Network entity 79 may or may not include video encoder 20. As described above, some of the techniques described in this disclosure may be implemented by network entity 79 prior to network entity 79 transmitting the encoded video bitstream to video decoder 30. In some video decoding systems, network entity 79 and video decoder 30 may be parts of separate devices, while in other instances, the functionality described with respect to network entity 79 may be performed by the same device that comprises video decoder 30. Although FIG. 1 shows depacketizer 29 as being part of destination device 14, the techniques described above with respect to depacketizer 29 may also be performed by a depacketizer within network entity 79.

During the decoding process, video decoder 30 receives an encoded video bitstream that represents video blocks of an encoded video slice and associated syntax elements from video encoder 20. The video blocks may, for example, be routed from video encoder 20 to video decoder 30 via one or more MANEs, such as MANE 27 in FIG. 1 or network entity 79 in FIG. 4. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 4 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as display device 32 of FIG. 1.

Figure 5:
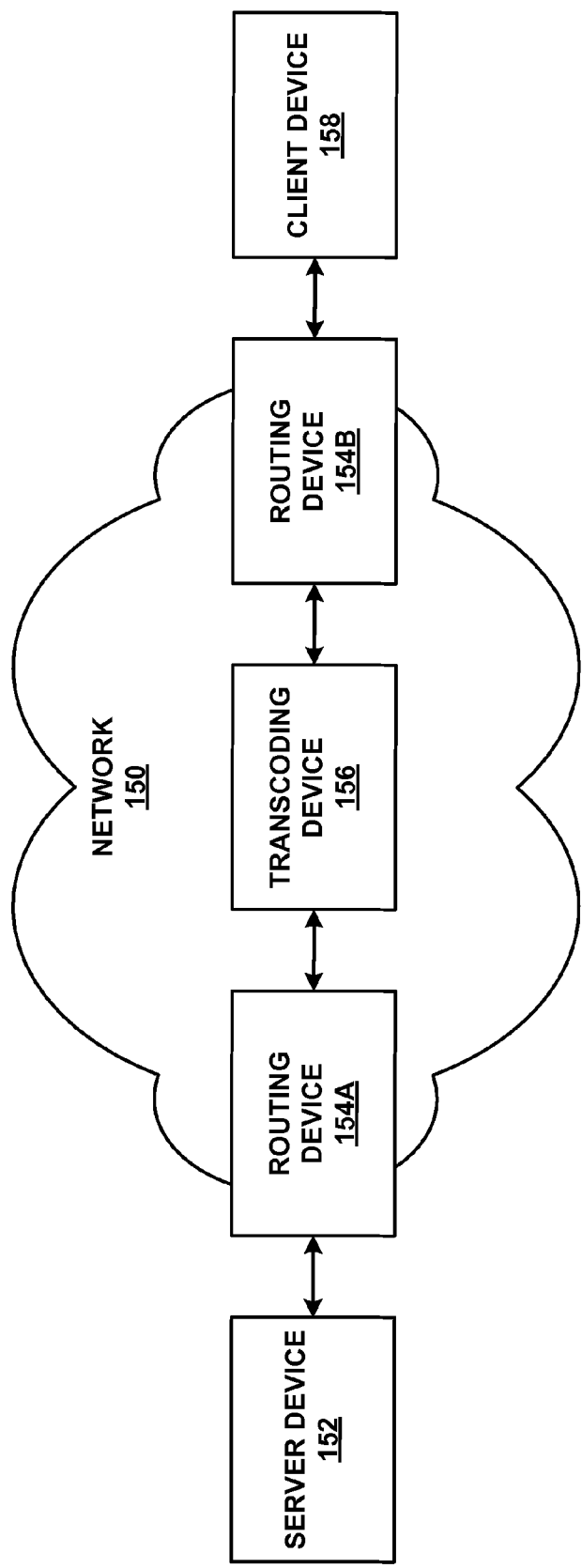
FIG. 5 is a block diagram illustrating an example set of devices that form part of a network.

FIG. 5 is a block diagram illustrating an example set of devices that form part of network 150. In this example, network 150 includes routing devices 154A, 154B (routing devices 154) and transcoding device 156. Routing devices 154 and transcoding device 156 are intended to represent a small number of devices that may form part of network 150. Other network devices, such as switches, hubs, gateways, firewalls, bridges, and other such devices may also be included within network 150. Moreover, additional network devices may be provided along a network path between server device 152 and client device 158. Server device 152 may correspond to source device 12 (FIG. 1), while client device 158 may correspond to destination device 14 (FIG. 1), in some examples. Routing devices 154 may, for example, be MANEs configured to rout media data.

In general, routing devices 154 implement one or more routing protocols to exchange network data through network 150. In general, routing devices 154 execute routing protocols to discover routes through network 150. By executing such routing protocols, routing device 154B may discover a network route from itself to server device 152 via routing device 154A. The various devices of FIG. 5 represent examples of devices that may implement the techniques of this disclosure and may be configured to process RTP data in accordance with the techniques of this disclosure.

Figure 6:
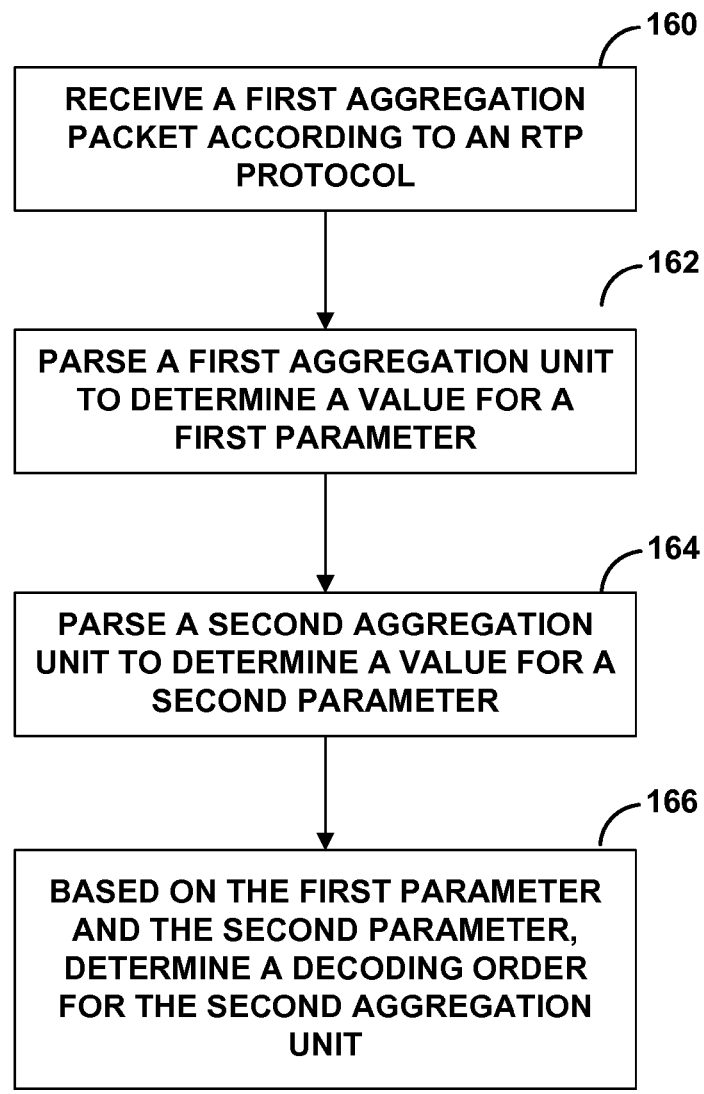
FIG. 6 shows an example method of depacketizing NAL units according to the techniques of this disclosure.

FIG. 6 shows an example of a method of processing video data according to the techniques of this disclosure. The techniques of FIG. 6 may, for example, be performed by a device such as destination device 14, and more particularly, may be performed by depacketizer 29 of destination device 14. Depacketizer 29 receives first aggregation packet according to an RTP protocol (160). The first aggregation packet may, for example, include a payload header and one or more aggregation units. Depacketizer 29 may parses a first aggregation unit to determine a value for a first parameter (162). The first parameter may, for example, correspond to the DONL parameter discussed above and may specify a decoding order number. Depacketizer 29 may parse a second aggregation unit to determine a value for a second parameter (164). The second aggregation unit may follow the first aggregation unit, and the second parameter may, for example correspond to the DOND parameter discussed above. Based on the first parameter and the second parameter, depacketizer 29 determines a decoding order for the second aggregation unit.

Figure 7:
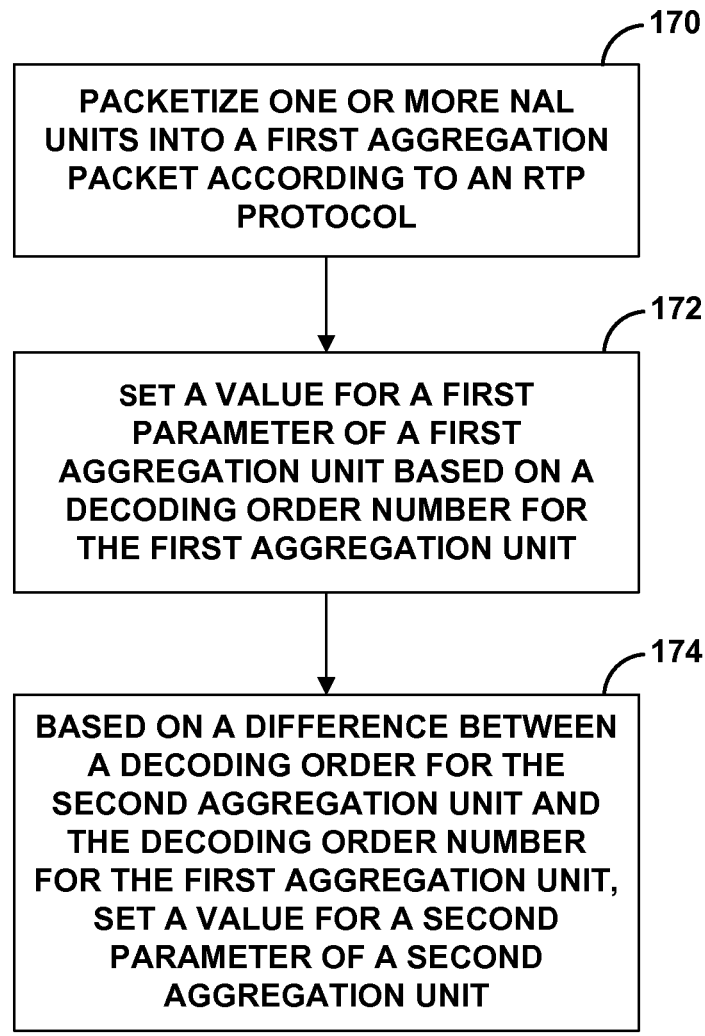
FIG. 7 shows an example method of packetizing NAL units according to the techniques of this disclosure.

FIG. 7 shows an example of a method of processing video data according to the techniques of this disclosure. The techniques of FIG. 7 may, for example, be performed by a device such as source device 12, and more particularly, may be performed by packetizer 21 of source device 12. Packetizer 21 receives one or more NAL units and packetizes the one or more NAL units into a first aggregation packet according to an RTP protocol (170). The first aggregation packet may, for example, include a payload header and one or more aggregation units. Packetizer 21 sets a value for a first parameter of a first aggregation unit based on a decoding order number for the NAL unit included in the first aggregation unit (172). The first parameter may, for example, correspond to the DONL parameter discussed above and may specify a decoding order number. The first parameter may, for example, specify a value of a number of least significant bits of the decoding order number. Based on a difference between a decoding order for the NAL unit included in the second aggregation unit and the decoding order number for the NAL unit included in the first aggregation unit, packetizer 21 may set a value for a second parameter of a second aggregation unit (174). The second aggregation unit may follow the first aggregation unit, and the second parameter may, for example correspond to the DOND parameter discussed above. The second parameter may, for example, identify a difference between the first parameter and the decoding order number.

Figure 8:
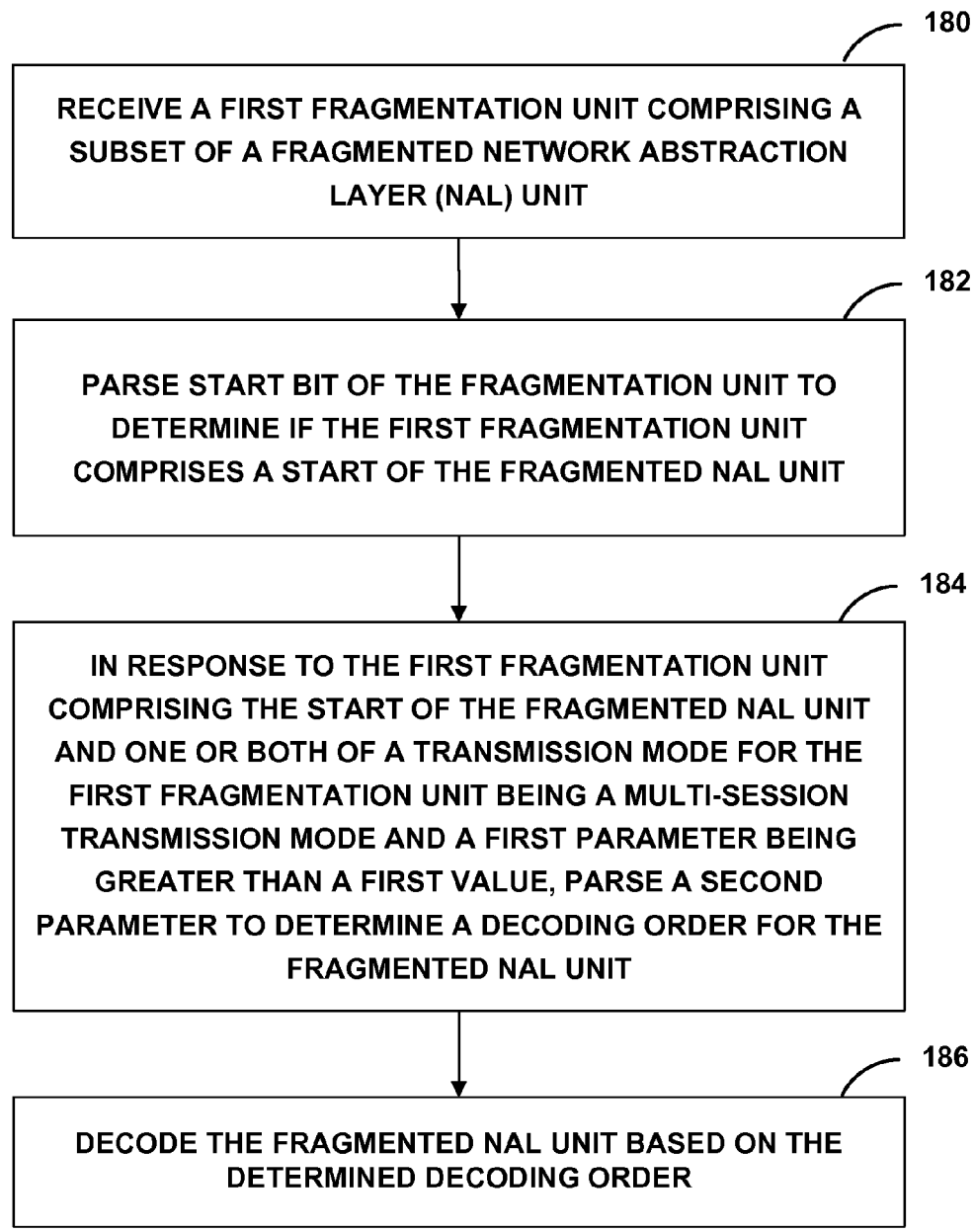
FIG. 8 shows an example method of depacketizing NAL units according to the techniques of this disclosure.

FIG. 8 shows an example of a method of processing video data according to the techniques of this disclosure. The techniques of FIG. 8 may, for example, be performed by a device such as destination device 14, and more particularly, may be performed by depacketizer 29 of destination device 14. Depacketizer 29 receives a first fragmentation unit that includes a subset of a fragmented NAL unit (180). Depacketizer 29 parses a start bit of the fragmentation unit to determine if the first fragmentation unit includes a start of the fragmented NAL unit (182). The start bit may, for example, be an S bit as described above. In response to the first fragmentation unit including the start of the fragmented NAL unit and one or both of a transmission mode for the first fragmentation unit being a multi-session transmission mode and a first parameter being greater than a first value, depacketizer 29 parses a second parameter to determine a decoding order for the fragmented NAL unit. The first parameter may, for example, be a sprop-depack-buf-nalus parameter as described above, and the first value may be zero. The second parameter may, for example, be a DONL parameter as described above. Destination device 14 may decode the fragmented NAL unit based on the determined decoding order (186).

Figure 9:
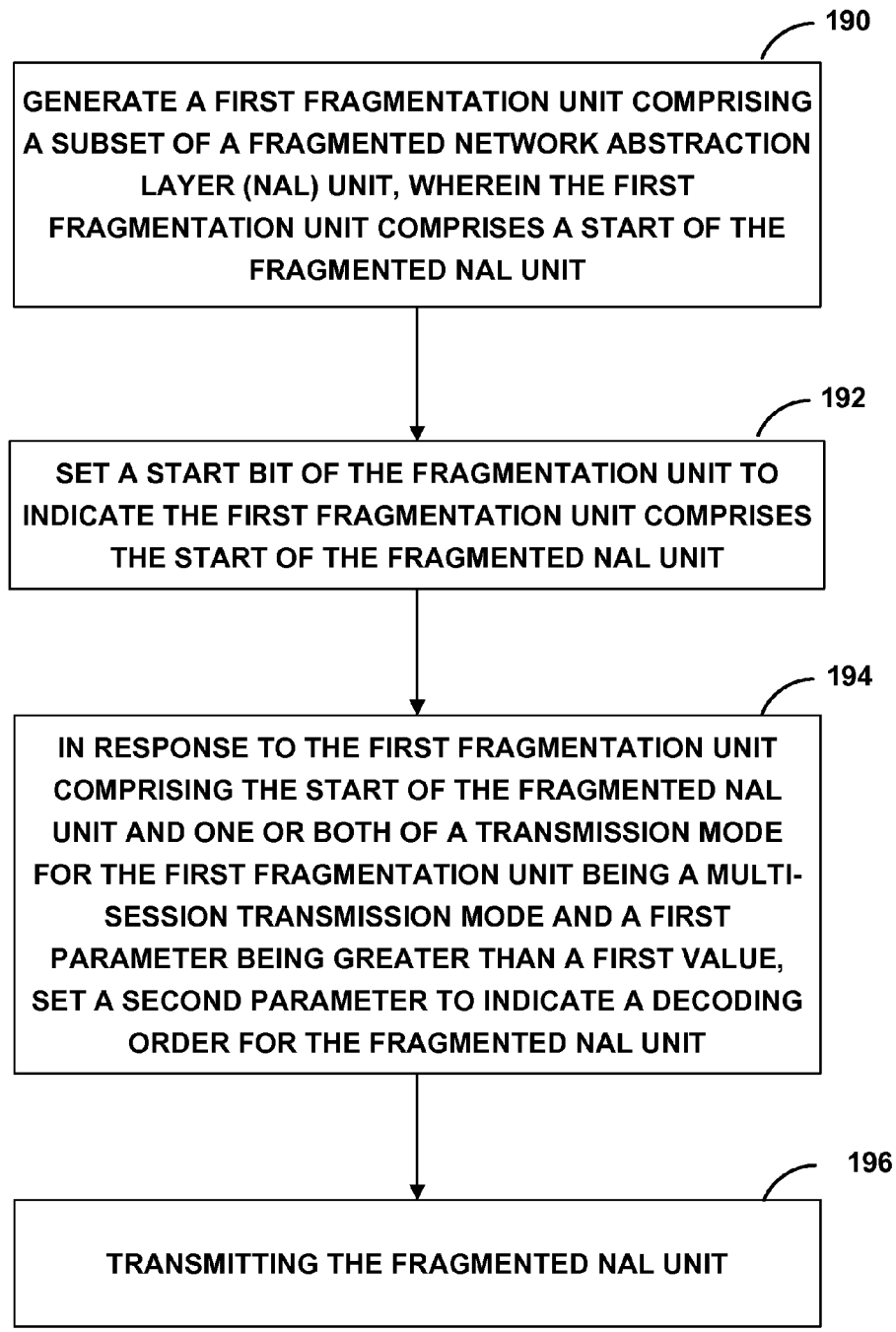
FIG. 9 shows an example method of packetizing NAL units according to the techniques of this disclosure.

FIG. 9 shows an example of a method of processing video data according to the techniques of this disclosure. The techniques of FIG. 9 may, for example, be performed by a device such as source device 12, and more particularly, may be performed by packetizer 21 of source device 12. Packetizer 21 generates first fragmentation unit comprising a subset of a fragmented NAL unit (190). The first fragmentation unit, for example, includes a start of the fragmented NAL unit. Packetizer 21 sets the start bit of the fragmentation unit to indicate the first fragmentation unit includes the start of the fragmented NAL unit (192). The start bit may, for example, be an S bit as described above. In response to the first fragmentation unit including the start of the fragmented NAL unit and one or both of a transmission mode for the first fragmentation unit being a multi-session transmission mode and a first parameter being greater than a first value. Packetizer 21 sets a second parameter to indicate a decoding order for the fragmented NAL unit. The first parameter may, for example, be an sprop-depack-buf-nalus parameter as described above, and the first value may be zero. The second parameter may, for example, be a DONL parameter as described above. Packetizer 21 may transmit the fragmented NAL unit (196). The first parameter may, for example, specify a maximum number of NAL units that precede the first NAL unit in a de-packetization buffer in reception order and follow the first NAL unit in a decoding order, and the second parameter may specify a value of a number of least significant bits of the decoding order number.

Figure 10:
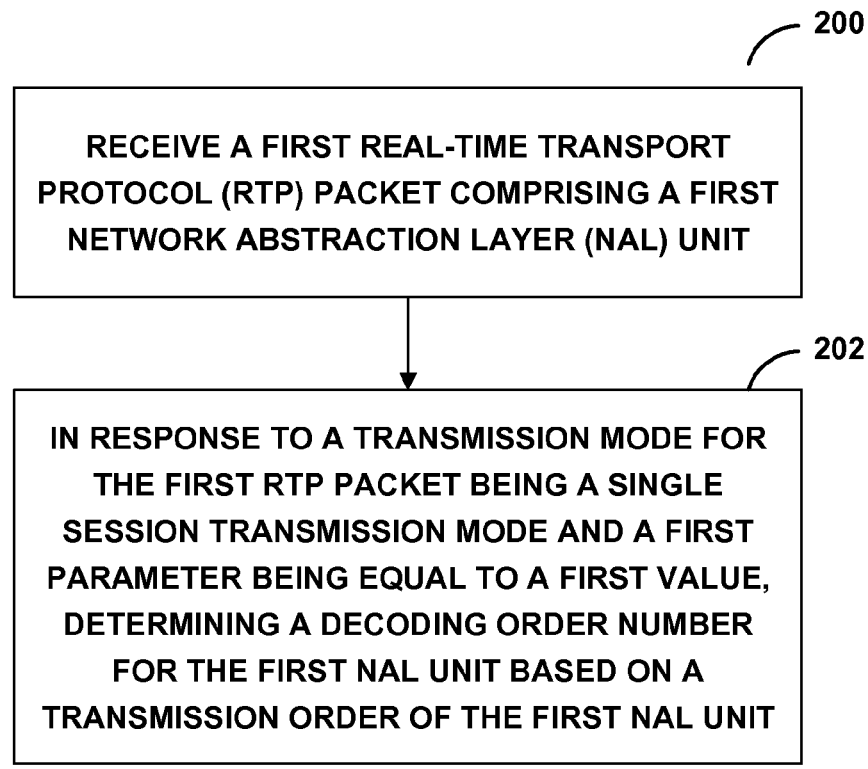
FIG. 10 shows an example method of depacketizing NAL units according to the techniques of this disclosure.

FIG. 10 shows an example of a method of processing video data according to the techniques of this disclosure. The techniques of FIG. 8 may, for example, be performed by a device such as destination device 14, and more particularly, may be performed by depacketizer 29 of destination device 14. Depacketizer 29 receives a first RTP packet comprising a first NA unit (200). In response to a transmission mode for the first RTP packet being a single session transmission mode and a first parameter being equal to a first value, depacketizer 29 determines a decoding order number for the first NAL unit based on a transmission order of the first NAL unit (202). The first parameter may, for example, be a sprop-depack-buf-nalus parameter as described above, and the value may be equal to zero.

Figure 11:
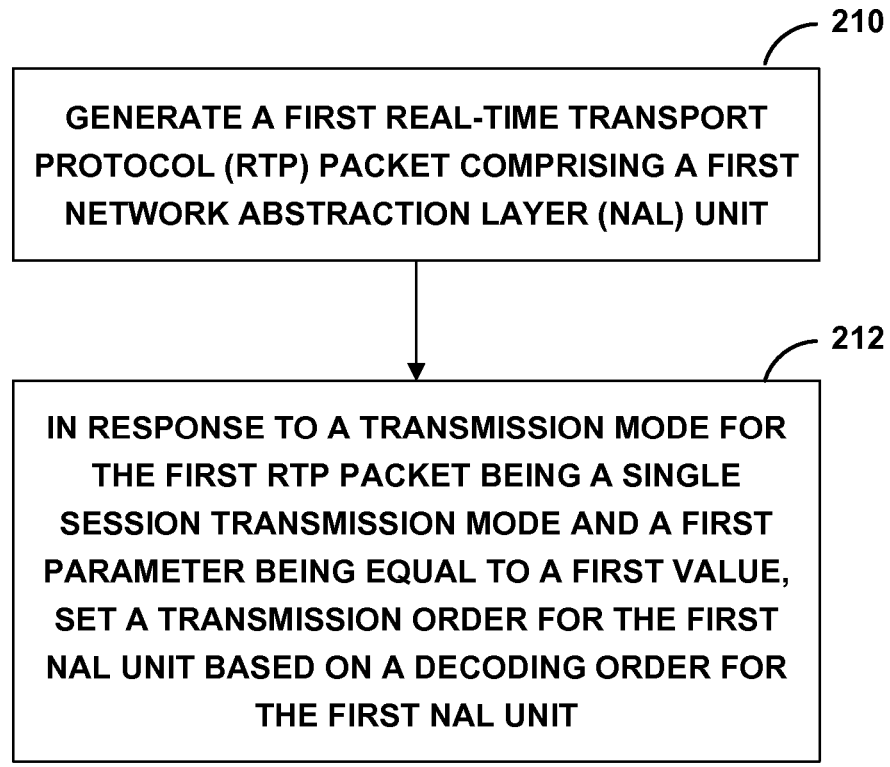
FIG. 11 shows an example method of packetizing NAL units according to the techniques of this disclosure.

FIG. 11 shows an example of a method of processing video data according to the techniques of this disclosure. The techniques of FIG. 9 may, for example, be performed by a device such as source device 12, and more particularly, may be performed by packetizer 21 of source device 12. Packetizer 21 generating a RT) packet comprising a first NA) unit (210). In response to a transmission mode for the first RTP packet being a single session transmission mode and a first parameter being equal to a first value, setting a transmission order for the first NAL unit based on a decoding order for the first NAL unit (212). The first parameter may, for example, be a sprop-depack-buf-nalus parameter as described above.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving a first aggregation packet according to a real-time transfer protocol (RTP), wherein the first aggregation packet comprises a payload header followed by payload data comprising a first aggregation unit and a second aggregation unit;
   in response to a transmission mode for the first aggregation packet comprising a multi-session transmission mode, parsing the first aggregation unit, that is the first aggregation unit of the first aggregation packet, to determine a value for a first parameter, wherein the first parameter specifies a decoding order number for a first network abstraction layer (NAL) unit included in the first aggregation unit, wherein the first aggregation unit includes a decoding order number of least significant bits (DONL) field comprising the value for the first parameter;
   parsing the second aggregation unit to determine a value for a second parameter, wherein the second aggregation unit follows the first aggregation unit in the first aggregation packet, and wherein the second parameter identifies a difference between the decoding order number for the first NAL unit included in the first aggregation unit and a decoding order number for a second NAL unit included in the second aggregation unit, wherein the second aggregation unit includes a decoding order number difference (DOND) field comprising the second value for the second parameter; and
   based on the first parameter and the second parameter, determining a decoding order for the second NAL unit included in the second aggregation unit.

2. The method of claim 1, wherein the first parameter specifies a value of a number of least significant bits of the decoding order number.

3. The method of claim 2, wherein the value of the number is 16.

4. The method of claim 1, wherein the second parameter plus one specifies the difference between a decoding order number of the second aggregation unit and the decoding order number of the first aggregation unit.

5. The method of claim 1, further comprising:
   parsing a third aggregation unit to determine a third parameter, wherein the third aggregation unit follows the second aggregation unit in the first aggregation packet; and
   based on the second parameter and the third parameter, determining a decoding order for a third NAL unit included in the third aggregation unit.

6. The method of claim 1, wherein parsing the first aggregation unit to determine the value for the first parameter is performed in response to a value of a third parameter being greater than 0, wherein the value for the third parameter specifies a maximum number of NAL units that precede a NAL unit in a de-packetization buffer in reception order and follow the NAL unit in decoding order.

7. The method of claim 1, further comprising:
   receiving a second aggregation packet according to the RTP protocol, wherein a transmission mode for the second aggregation packet comprises a single session transmission (SST) mode;
   determining a value for a fourth syntax element is equal to zero, wherein the value of the fourth syntax element indicates a maximum number of NAL units that precede a NAL unit in a de-packetization buffer in reception order and follow the NAL unit in decoding order; and in response to the SST mode and the fourth syntax element equaling 0, determining that a first aggregation unit of the second aggregation packet does not comprise an indication of a syntax element indicating a decoding order number.

8. A device for processing video data, the apparatus comprising:

a memory configured to store the video data;

a receiver configured to receive real-time transport protocol (RTP) packets comprising the video data;

one or more processors configured to:

receive a first aggregation packet according to a real-time transfer protocol (RTP), wherein the first aggregation packet comprises a payload header followed by payload data comprising a first aggregation unit and a second aggregation unit;

parse the first aggregation unit that is the first aggregation unit of the first aggregation packet to determine a value for a first parameter, wherein the first parameter specifies a decoding order number for a first network abstraction layer (NAL) unit included in the first aggregation unit, wherein the first aggregation unit includes a decoding order number of least significant bits (DONL) field comprising the value for the first parameter;

in response to a transmission mode for the first aggregation packet comprising a multi-session transmission mode, parse the second aggregation unit to determine a value for a second parameter, wherein the second aggregation unit follows the first aggregation unit in the first aggregation packet, and wherein the second parameter identifies a difference between the decoding order number for the first NAL unit included in the first aggregation unit and a decoding order number for a second NAL unit included in the second aggregation unit, wherein the second aggregation unit includes a decoding order number difference (DOND) field comprising the value for the second parameter; and based on the first parameter and the second parameter, determine a decoding order for the second NAL unit included in the second aggregation unit.

9. The device of claim 8, wherein the first parameter specifies a value of a number of least significant bits of the decoding order number.

10. The device of claim 9, wherein the value of the number is 16.

11. The device of claim 8, wherein the second parameter plus one specifies the difference between a decoding order number of the second aggregation unit and the decoding order number of the first aggregation unit.

12. The device of claim 8, wherein the one or more processors are further configured to:

parse a third aggregation unit to determine a third parameter, wherein the third aggregation unit follows the second aggregation unit in the first aggregation packet; and based on the second parameter and the third parameter, determine a decoding order for a third NAL unit included in the third aggregation unit.

13. The device of claim 8, wherein the one or more processors are configured to parse the first aggregation unit to determine the value for the first parameter in response to a value of a third parameter being greater than 0, wherein the value for the third parameter specifies a maximum number of NAL units that precede a NAL unit in a de-packetization buffer in reception order and follow the NAL unit in decoding order.

14. The device of claim 8, wherein the one or more processors are configured to:

receive a second aggregation packet according to the RTP protocol, wherein a transmission mode for the second aggregation packet comprises a single session transmission (SST) mode;

determine a value for a fourth syntax element is equal to zero, wherein the value of the fourth syntax element indicates a maximum number of NAL units that precede a NAL unit in a de-packetization buffer in reception order and follow the NAL unit in decoding order; and in response to the SST mode and the fourth syntax element equaling 0, determine that a first aggregation unit of the second aggregation packet does not comprise an indication of a syntax element indicating a decoding order number.

15. The device of claim 8, wherein the device comprises at least one of:

an integrated circuit;

a microprocessor; or a wireless communication device that comprises a video coder.

16. A non-transitory computer-readable storage medium storing instructions that when executed by one or more processors cause the one or more processors to:

receive a first aggregation packet according to a real-time transfer protocol (RTP), wherein the first aggregation packet comprises a payload header followed by payload data comprising a first aggregation unit and a second aggregation unit;

in response to a transmission mode for the first aggregation packet comprising a multi-session transmission mode, parse the first aggregation unit that is the first aggregation unit of the first aggregation packet to determine a value for a first parameter, wherein the first parameter specifies a decoding order number for a first network abstraction layer (NAL) unit included in the first aggregation unit, wherein the first aggregation unit includes a decoding order number of least significant bits (DONL) field comprising the value for the first parameter;

parse the second aggregation unit to determine a value for a second parameter, wherein the second aggregation unit follows the first aggregation unit in the first aggregation packet, and wherein the second parameter identifies a difference between the decoding order number for the first NAL unit included in the first aggregation unit and a decoding order number for a second NAL unit included in the second aggregation unit, wherein the second aggregation unit includes a decoding order number difference (DOND) field comprising the value for the second parameter; and based on the first parameter and the second parameter, determine a decoding order for the second NAL unit included in the second aggregation unit.

17. The non-transitory computer-readable storage medium of claim 16, wherein the first parameter specifies a value of a number of least significant bits of the decoding order number, and wherein the number is 16.

18. The non-transitory computer-readable storage medium of claim 16, wherein the second parameter plus one specifies the difference between a decoding order number of the second aggregation unit and the decoding order number of the first aggregation unit.

19. The non-transitory computer-readable storage medium of claim 16, storing further instructions that when executed by the one or more processors cause the one or more processors to:
parse a third aggregation unit to determine a third parameter, wherein the third aggregation unit follows the second aggregation unit in the first aggregation packet; and
based on the second parameter and the third parameter, determine a decoding order for a third NAL unit included in the third aggregation unit.

20. The non-transitory computer-readable storage medium of claim 16, wherein parsing the first aggregation unit to determine the value for the first parameter is performed in response to a value of a third parameter being greater than 0, wherein the value for the third parameter specifies a maximum number of NAL units that precede a NAL unit in a de-packetization buffer in reception order and follow the NAL unit in decoding order.

21. The non-transitory computer-readable storage medium of claim 16, storing further instructions that when executed cause the one or more processors to:
receive a second aggregation packet according to the RTP protocol, wherein a transmission mode for the second aggregation packet comprises a single session transmission (SST) mode;
determine a value for a fourth syntax element is equal to zero, wherein the value of the fourth syntax element indicates a maximum number of NAL units that precede a NAL unit in a de-packetization buffer in reception order and follow the NAL unit in decoding order; and
in response to the SST mode and the fourth syntax element equaling 0, determine that a first aggregation unit of the second aggregation packet does not comprise an indication of a syntax element indicating a decoding order number.

22. A method of processing video data, the method comprising:
packetizing one or more network abstraction layer (NAL) units into a first aggregation packet according to an RTP protocol;
in response to a transmission mode for the first aggregation packet comprising a multi-session transmission mode, setting a value for a first parameter of a first aggregation unit based on a decoding order number for a first NAL unit included in the first aggregation unit, wherein the first aggregation unit includes a decoding order number of least significant bits (DONL) field comprising the value for the first parameter; and
based on a difference between a decoding order for a second aggregation unit and the decoding order number for the first aggregation unit, setting a value for a second parameter of a second aggregation unit, and wherein the second parameter identifies a difference between the decoding order number for the first NAL unit included in the first aggregation unit and a decoding order number for a second NAL unit included in the second aggregation unit, wherein the first aggregation unit includes a decoding order number difference (DOND) field comprising the value for the first parameter.

23. The method of claim 22, wherein the first parameter specifies a value of a number of least significant bits of the decoding order number.

24. The method of claim 22, wherein the second parameter identifies a difference between the first parameter and the decoding order number.

* * * * *